US008259053B2

(12) United States Patent
Shin (10) Patent No.: US 8,259,053 B2
(45) Date of Patent: Sep. 4, 2012

(54) ARRAY SUBSTRATE AND LIQUID CRYSTAL DISPLAY DEVICE HAVING THE SAME

(75) Inventor: Kyoung-Ju Shin, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 450 days.

(21) Appl. No.: 12/557,360

(22) Filed: Sep. 10, 2009

(65) Prior Publication Data

US 2010/0123841 A1 May 20, 2010

(30) Foreign Application Priority Data

Nov. 18, 2008 (KR) ................ 2008-114542

(51) Int. Cl.
*G09G 3/36* (2006.01)
*G02F 1/1343* (2006.01)

(52) U.S. Cl. ............ 345/95; 345/87; 349/38; 349/39; 349/141; 349/144

(58) Field of Classification Search ............ 349/38, 349/49, 48, 141, 144
See application file for complete search history.

(56) References Cited

U.S. PATENT DOCUMENTS

| 2003/0169379 | A1* | 9/2003 | Tsumura et al. | 349/42 |
| 2005/0046763 | A1* | 3/2005 | Ono et al. | 349/39 |
| 2007/0002194 | A1* | 1/2007 | Shin | 349/38 |
| 2007/0242206 | A1* | 10/2007 | Yoon | 349/141 |

* cited by examiner

*Primary Examiner* — Joseph Haley
*Assistant Examiner* — Nicholas Lee
(74) *Attorney, Agent, or Firm* — Innovation Counsel LLP (57) ABSTRACT

An array substrate and a liquid crystal display (LCD) device having the array substrate are provided in one or more embodiments. For example, the array substrate may include a pixel electrode, a coupling electrode and an opposite electrode. The pixel electrode may include a first sub-electrode having a plurality of first electrode bars receiving a first voltage and a second sub-electrode having a plurality of second electrode bars. The plurality of first electrode bars and the plurality of second electrode bars may be spaced apart from each other. The coupling electrode may be electrically connected to a portion of the plurality of first electrode bars, may have a plurality of opposite electrode bars and may overlap a portion of the plurality of second electrode bars to form coupling capacitor. The opposite electrode may be disposed between the plurality of first electrode bars and the plurality of second electrode bars to receive a second voltage different from the first voltage.

20 Claims, 7 Drawing Sheets

ARRAY SUBSTRATE AND LIQUID CRYSTAL DISPLAY DEVICE HAVING THE SAME

CROSS-REFERENCE TO RELATED APPLICATIONS

This application claims priority under 35 U.S.C. §119 to Korean Patent Application No. 2008-114542, filed on Nov. 18, 2008 in the Korean Intellectual Property Office (KIPO), the contents of which are herein incorporated by reference in their entirety.

BACKGROUND

1. Technical Field

Example embodiments of the present disclosure relate generally to an array substrate and a liquid crystal display (LCD) device having the array substrate.

2. Related Art

Generally, a liquid crystal display (LCD) device displays images using a process in which a voltage difference is applied to a common electrode and a pixel electrode that are formed on upper and lower substrates, respectively, with liquid crystal arranged between the upper and lower substrates.

Since light from the LCD device is transmitted in a direction that is not blocked by liquid crystal molecules of a liquid crystal layer to display images, a viewing angle is narrower compared to other types of display devices. In order to implement a wide viewing angle, a patterned vertical alignment (PVA) mode and an in-plane switching (IPS) mode have been developed.

In a PVA-mode LCD device, a common electrode is formed on an upper substrate and a pixel electrode is formed on a lower substrate. When power is applied to the common electrode and the pixel electrode, an electric field of a vertical direction is formed between the common electrode and the pixel electrode to drive a liquid crystal layer interposed between the two substrates.

In the IPS-mode LCD device, two electrodes are formed on one substrate. When power is applied to the two electrodes, an electric field of a horizontal direction is formed between the two substrates to drive the liquid crystal.

However, in both the PVA-mode LCD device and the IPS-mode LCD device, side visibility may be reduced in comparison with front visibility.

SUMMARY

One or more embodiments of the present invention may provide an array substrate capable of enhancing side visibility.

One or more embodiments of the present invention may also provide a liquid crystal display (LCD) device having the above-mentioned array substrate.

In one or more embodiments, an array substrate includes a pixel electrode, a coupling electrode, and an opposite electrode. The pixel electrode may include a first sub-electrode having a plurality of first electrode bars receiving a first voltage and a second sub-electrode having a plurality of second electrode bars. The plurality of first electrode bars and the plurality of second electrode bars may be spaced apart from each other. The coupling electrode may be electrically connected to a portion of the plurality of first electrode bars. The coupling electrode may overlap a portion of the plurality of second electrode bars to form a coupling capacitor. The opposite electrode is disposed between the first electrode bars and the second electrode bars to receive a second voltage and having a plurality of opposite electrode bars.

In one or more embodiments, an array substrate includes first and second switching elements, a pixel electrode, an opposite electrode, and a third switching element. The first and second switching elements may be connected to a first gate line and a first data line crossing the first gate line to receive a first voltage. The pixel electrode may include a first sub-electrode having a plurality of first electrode bars connected to the first switching element to receive the first voltage and a second sub-electrode having a plurality of second electrode bars connected to the second switching element to receive the first voltage. The opposite electrode may include a plurality of third electrode bars disposed between the plurality of first electrode bars and a plurality of fourth electrode bars disposed between the plurality of second electrode bars. The opposite electrode may receive a second voltage transmitted to a second data line adjacent to the first data line. The third switching element may be connected to the second electrode bars, the fourth electrode bars and a second gate line adjacent to the first gate line. The third switching element may control a pixel voltage of the second sub-electrode in response to a gate signal applied through the second gate line.

In one or more embodiments, an LCD device includes a first switching element, a second switching element, a first liquid crystal capacitor, a second liquid crystal capacitor, and a coupling capacitor. The first switching element is connected to a gate line and a first data line crossing the gate line to receive a first voltage. The second switching element is connected to the gate line and a second data line adjacent to the first data line to receive a second voltage. The first liquid crystal capacitor may be connected between an output terminal of the first switching element and an output terminal of the second switching element. The second liquid crystal capacitor may be connected in parallel to the first liquid crystal capacitor between the output terminal of the first switching element and the output terminal of the second switching element. The coupling capacitor may be connected between the output terminal of the first switching element and a first electrode of the second liquid crystal capacitor.

In one or more embodiments an array substrate and an LCD device having the array substrate, for the LCD device employing a horizontal electric field driving method, one pixel is divided into two sub-pixels and different pixel voltages are applied to the two sub-pixels, so that side visibility may be enhanced.

BRIEF DESCRIPTION OF THE DRAWINGS

The above and other features and advantages of embodiments of the present invention will become more apparent by describing in detail example embodiments thereof with reference to the accompanying drawings, in which.

DETAILED DESCRIPTION

The present disclosure is described more fully hereinafter with reference to the accompanying drawings, in which one or more embodiments are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. For example, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

One or more embodiments are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Example Embodiment 1

Figure 1:
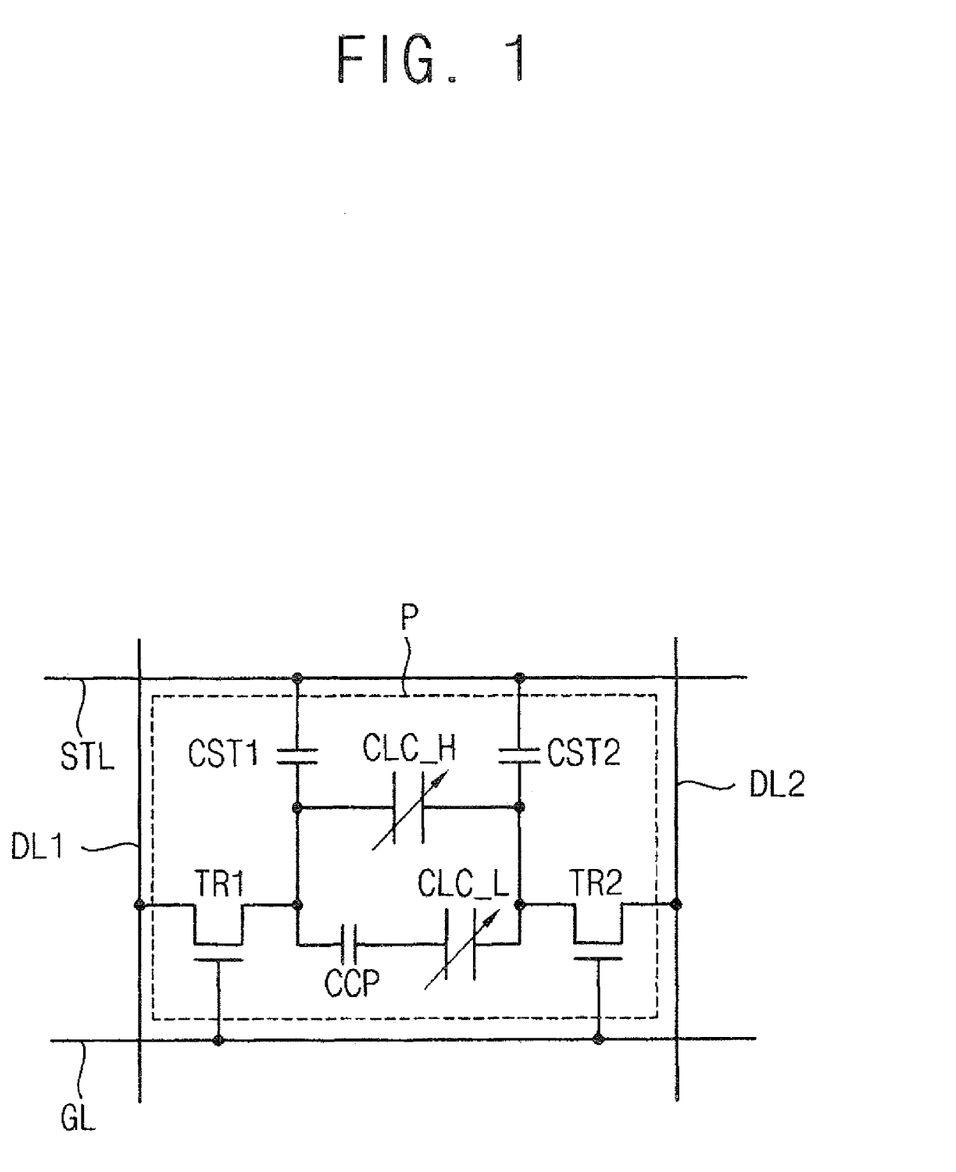
FIG. 1 is an equivalent circuit diagram illustrating a liquid crystal display (LCD) device in accordance with one or more embodiments (Embodiment 1)

FIG. 1 is an equivalent circuit diagram illustrating a liquid crystal display (LCD) device in accordance with one or more embodiments (e.g. Embodiment 1).

Referring to FIG. 1, the LCD device includes a pixel P. The pixel P is driven by a gate signal and a data signal. The gate signal is transmitted through a gate line GL, and the data signal is transmitted through a first data line DL1 and a second data line DL2. The pixel P may include a first switching element TR1, a second switching element TR2, a first liquid crystal capacitor CLC_H, a second liquid crystal capacitor CLC_L, a coupling capacitor Ccp, a first storage capacitor CST1, and a second storage capacitor CST2.

The first and second data lines DL1 and DL2 may extend in parallel with a direction crossing the gate line GL. The first data line DL1 may transmit a first voltage to the pixel P, and the second data line DL2 may transmit a second voltage to the pixel P. The second voltage may be different from the first voltage. The first and second voltages may have polarities different from each other with respect to a common voltage Vcom applied to a storage line STL. For example, the first voltage may have a positive polarity, and the second voltage may have a negative polarity. The second voltage may be synchronized with the first voltage. A voltage of the positive polarity (+) and a voltage of the negative polarity (−) may be applied to the pixel P, so that the first liquid crystal capacitor CLC_H may be driven by a high voltage. Thus, a dual polarity driving process may enhance the response time and transmissivity of liquid crystal.

The storage line STL may extend in parallel with the gate line GL to transmit the common voltage Vcom.

The first switching element TR1 may include a control terminal (hereinafter referred to as gate electrode) electrically connected to the gate line GL, an input terminal (hereinafter referred to as source electrode) electrically connected to the first data line DL1 and an output terminal (hereinafter referred to as drain electrode) electrically connected to a first electrode of the coupling capacitor Ccp.

The second switching element TR2 may include a gate electrode electrically connected to the gate line GL, a source electrode electrically connected to the second data line DL2, and a drain electrode electrically connected to a second electrode of the second liquid crystal capacitor CLC_L.

The first liquid crystal capacitor CLC_H may include a first electrode electrically connected to the drain of the first switching element TR1, a second electrode electrically connected to the drain of the second switching element TR2, and liquid crystal interposed between the first and second electrodes.

The second liquid crystal capacitor CLC_L may include a first electrode electrically connected to a second electrode of the coupling capacitor Ccp, a second electrode electrically connected to the drain electrode of the second switching element TR2, and liquid crystal interposed between the first electrode and the second electrode.

The coupling capacitor Ccp may include a first electrode electrically connected to the drain electrode of the first switching element TR1 and a second electrode electrically connected to a first electrode of the second liquid crystal capacitor CLC_L.

In accordance with one or more embodiments, a first electrode of the first storage capacitor CST1 is electrically connected to the drain electrode of the first switching element TR1, and a second electrode of the first storage capacitor CST1 is electrically connected to the storage line STL. A first electrode of the second storage capacitor CST2 is electrically connected to the drain electrode of the second switching element TR2, and a second electrode of the second storage capacitor CST2 is electrically connected to the storage line STL. A first pixel voltage being charged in the first liquid capacitor CLC_H and a second pixel voltage being charged in the second liquid capacitor CLC_L are maintained by the first and the second storage capacitors CST1 and CST2 for one frame.

A driving process of the pixel P is described below.

In accordance with one or more embodiments, when the gate signal is applied to the gate line GL, the first and the second switching elements are turned on. A first pixel voltage may be charged in the first liquid crystal capacitor CLC_H by the first voltage being transmitted through the first data line DL1 and the second voltage being transmitted through the second data line DL2. The first pixel voltage charged in the first liquid crystal capacitor CLC_H may also be charged in and divided between the coupling capacitor Ccp and the second liquid crystal capacitor CLC_L which are connected in parallel with the first liquid crystal capacitor CLC_H. A second pixel voltage lower than the first pixel voltage is charged to the second liquid crystal capacitor CLC_L. The coupling capacitor Ccp may be designed so that the second pixel voltage is about 0.5 to about 0.8 times the first pixel voltage.

Figure 2:
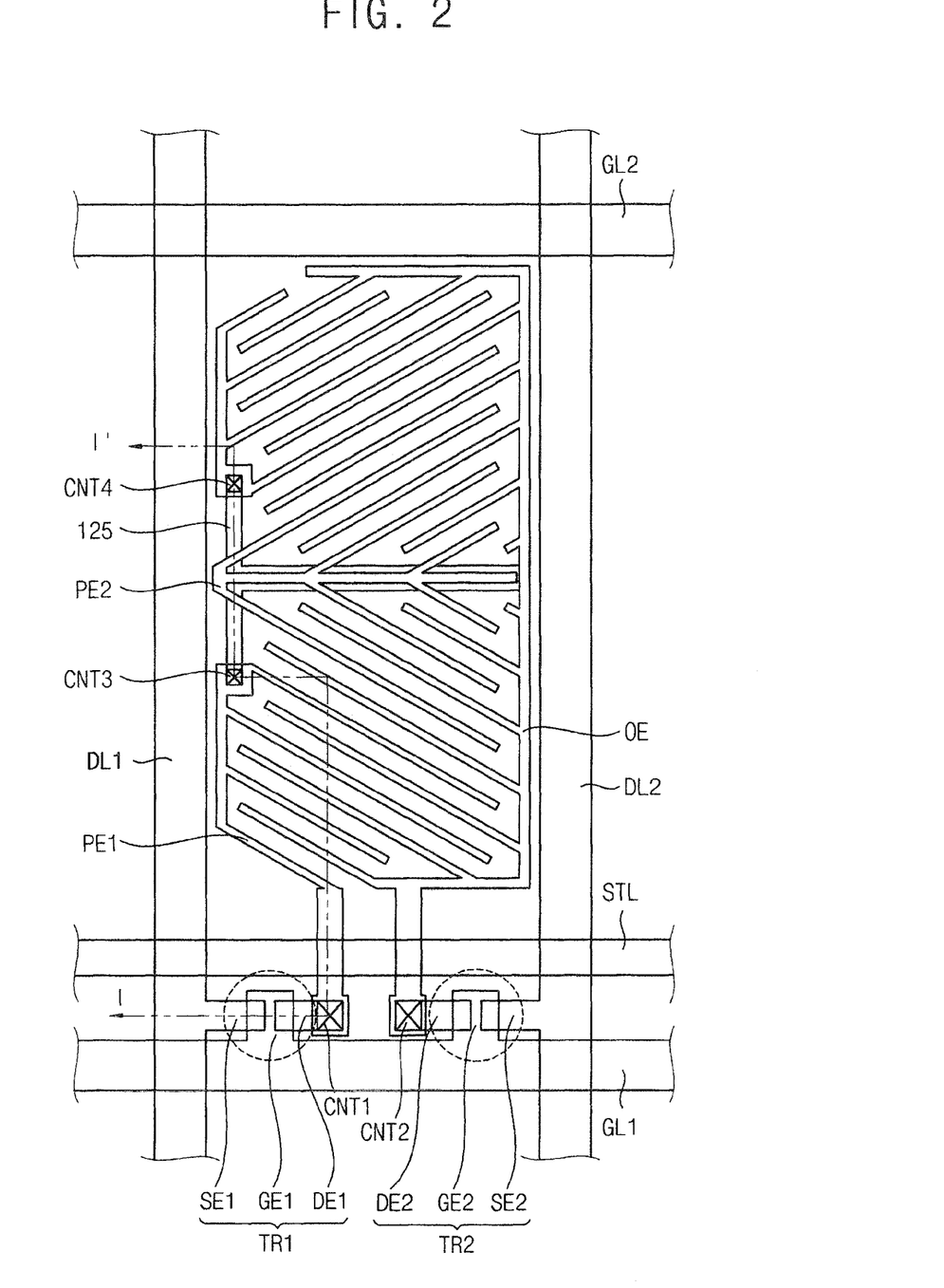
FIG. 2 is a plan view illustrating the LCD device of FIG. 1 in accordance with one or more embodiments.
Figure 3:
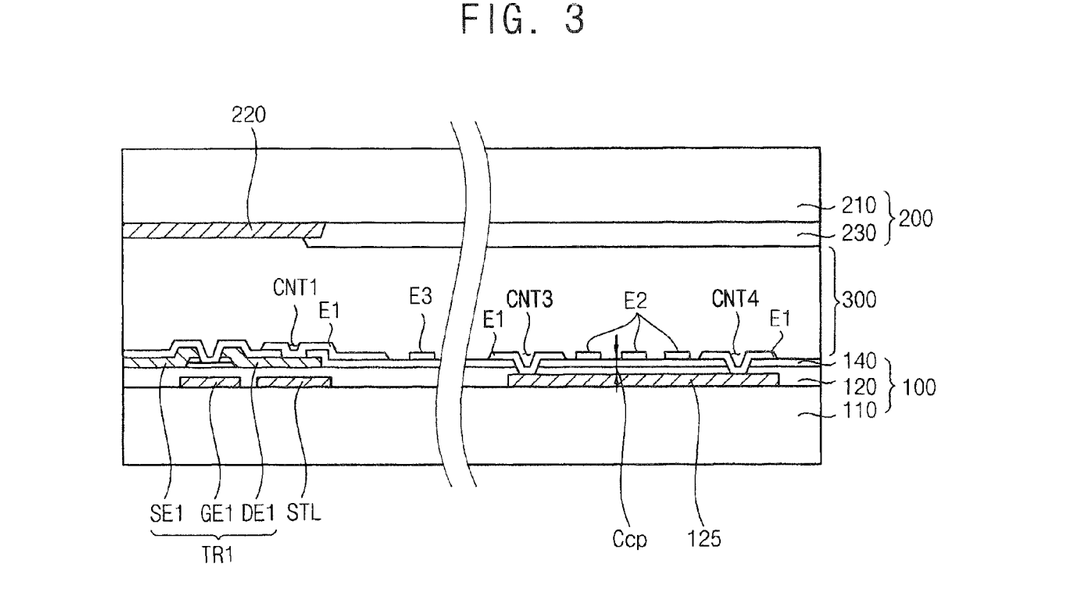
FIG. 3 is a cross-sectional view taken along a line I-I' in FIG. 2 in accordance with one or more embodiments.

FIG. 2 is a plan view illustrating the LCD device of FIG. 1. FIG. 3 is a cross-sectional view taken along a line I-I' in FIG. 2.

Referring to FIGS. 1 to 3, one or more embodiments of the LCD device include an array substrate 100 and an opposite substrate 200 combined with the array substrate to receive a liquid crystal layer 300.

The array substrate 100 may include a first base substrate 110 having a pixel area defined thereon. The gate electrodes GE1 and GE2, the gate line GL, the storage line STL, a pixel electrode PE and an opposite electrode OE are formed on the first base substrate 110. The pixel electrode PE may include a first sub-electrode PE1 and a second sub-electrode PE2.

In one or more embodiments, the first switching element TR1 is formed in an area adjacent to a crossing area of the gate line GL and the first data line DL1. A gate electrode GE1 of the first switching element TR1 is electrically connected to the gate line GL, a source electrode SE1 of the first switching element TR1 is electrically connected to the first data line DL1, and a drain electrode DE1 of the first switching element TR1 is electrically connected to a portion of the first sub-electrode PE1 through a first contact portion CNT1.

The second switching element TR2 is formed in an area adjacent to a crossing area of the gate line GL and the second data line DL2. A gate electrode GE2 of the second switching element TR2 is electrically connected to the gate line GL, a source electrode SE2 of the second switching element TR2 is electrically connected to the second data line DL2, and a drain electrode DE2 of the second switching element TR2 is electrically connected to a portion of the opposite electrode OE through a second contact portion CNT2.

The first sub-electrode PE1 may include a plurality of patterned first electrode bars E1. The first electrode bars E1 may be formed at two edge portions of a pixel area defined on the first base substrate 110, which are spaced apart from each other. To form the coupling capacitor Ccp, the first electrode bars E1 may be physically and electrically connected to each other through the coupling electrode 125, a third contact portion CNT3 and a fourth contact portion CNT4. The first sub-electrode PE1 is connected to the first switching element TR1 to receive the first voltage transmitted from the first data line DL1. The coupling electrode 125 is electrically connected to a portion of the first electrode bars E1 through the third and fourth contact portions CNT3 and CT4, and is overlapped with a portion of the second electrode bars E2.

The second sub-electrode PE2 may include a plurality of patterned second electrode bars E2. The second electrode bars E2 are formed at a center portion of the pixel area, and may overlap with a portion of the coupling electrode 125. The second sub-electrode PE2 is plotted to be spaced apart from the first sub-electrode PE1 and the coupling electrode 125.

The coupling capacitor Ccp may be defined by a gate insulation layer 120 and a passivation layer 140 at an overlapping portion of the second electrode bars E2 and the coupling electrode 125. That is, a first electrode of the coupling capacitor Ccp is connected to the coupling electrode 125, and a second electrode of the coupling capacitor Ccp is connected to the second electrode bar E2 overlapped with the coupling electrode 125.

The opposite electrode OE may be formed adjacent to the second data line GL2. The opposite electrode OE is connected to the second switching element TR2 to receive the second voltage transmitted from the second data line GL2. The opposite electrode OE may include a plurality of third electrode bars E3. The third electrode bars E3 are disposed between the first and second electrode bars E1 and E2 that are spaced apart from each other.

In one or more embodiments, the first to third electrode bars E1, E2, and E3 may have a comb shape. The first and second electrode bars E1 and E2 may protrude toward the second data line DL2, and the third electrode bar E3 may protrude toward the first data line DL1. The first to third electrode bars E1, E2, and E3 may be formed on the same plane. A first horizontal electric field may be formed by voltages applied to the first and third electrode bars E1 and E3, and a second horizontal electric field may be formed by voltages applied to the second and third electrode bars E2 and E3.

Accordingly, the first voltage transmitted from the first data lines DL1 is applied to the first sub-electrode PE1, and a divided voltage divided by the coupling capacitor Ccp is applied to the second sub-electrode PE2. That is, a lower voltage than the first voltage is applied to the second sub-electrode PE2.

In one or more embodiments, the storage line STL may be formed in parallel with the first gate line GL1. The storage line STL may overlap with the first sub-electrode PE1 and a portion of the opposite electrode OE. The first storage capacitor CST1 may be defined by the gate insulation layer 120 formed between the first sub-electrode PE1 and the storage line STL and the passivation layer 140, and the second storage capacitor CST2 may be defined by the gate insulation layer 120 formed between the opposite electrode OE and the storage line STL and the passivation layer 140. A first electrode of the first storage capacitor CST1 may be connected to the first sub-electrode PE1, and a second electrode of the first storage capacitor CST1 may be connected to the storage line STL to receive the common voltage Vcom. A first electrode of the second storage capacitor CST2 may be connected to the opposite electrode OE, and a second electrode of the second storage capacitor CST2 may be connected to the storage line STL to receive the common voltage Vcom.

The opposite substrate 200 may include a second base substrate 210. A light-blocking layer 220 and a color filter layer 230 may be formed on the second base substrate 210.

The light-blocking layer 220 may be formed in an area surrounding edge portions of the first and second sub-electrodes PE1 and PE2 to block light. The light-blocking layer 220 may include a material having conductivity.

In one or more embodiments, the color filter layer 230 is formed on the second base substrate 210 corresponding to the first and second sub-electrodes PE1 and PE2 of the array substrate 100. The color filter layer 230 may be formed by an etching process patterning a color photoresist layer, or may be formed by an ink printing process. The color filter layer 230 may include a red color filter, a green color filter, and a blue color filter.

A liquid crystal layer 300 may be driven in a normally black mode. That is, the liquid crystal layer 300 displays black in a non-electric field state, and displays white in electric field state. Liquid crystal molecules of the liquid crystal layer 300 may be vertically aligned to block light in a non-electric field state. Liquid crystal molecules of the liquid crystal layer 300 may be inclined by a horizontal electric field formed between the first and second electrode bars E1 and E2 and a horizontal electric field formed between the second and third electrode bars E2 and E3 to transmit light.

In accordance with one or more embodiments (e.g. Embodiment 1), the first and second sub-electrodes PE1 and PE2 may be driven through pixel voltages different from each other by using the coupling capacitor Ccp, so that side visibility may be enhanced. In addition, according to Embodiment 1, an interval between the first and second sub-electrodes PE1 and PE2 and the opposite electrodes OE may be uniform, so that the response time of liquid crystals may be uniform.

Hereinafter, one or more embodiments of a manufacturing process of the array substrate 100 will be described with reference to FIGS. 2 and 3.

Referring to FIGS. 2 and 3, a gate metal layer (not shown) is formed on the first base substrate 110, and then the gate metal layer is patterned to form a gate metal pattern including the gate line GL1, the gate electrodes GE1 and GE2, the storage line STL, and the coupling electrode 125.

Then, the gate insulation layer 120 is formed on the first base substrate 110 having the gate metal pattern formed thereon. A plurality of semiconductor patterns is formed on the first base substrate 110 having the gate insulation layer 120 formed thereon.

Then, a source metal layer is formed on the first base substrate 110 having the semiconductor patterns formed thereon. The source metal layer is patterned through a photoetching process to form the first and second data lines DL1 and DL2, the source electrodes SE1 and SE2, and the drain electrodes DE1 and DE2.

The passivation layer 140 is formed on the first base substrate 110 having the source metal pattern formed thereon. The passivation layer 140 may include silicon nitride (SiNx), silicon oxide (SiOx), etc.

Then, the passivation layer 140 is etched to form the first to fourth contact portions CNT1, CNT2, CNT3, and CNT4 exposing the drain electrodes DE1 and DE2 and the coupling electrode 125.

In one or more embodiments, a transparent conductive layer is formed on the first base substrate 100 having the first to fourth contact portions CNT1, CNT2, CNT3, and CNT4 formed thereon. The transparent conductive layer is patterned to form the first sub-electrode PE1 having the first electrode bars E1, a second sub-electrode PE2 having the second electrode bars E2, and an opposite electrode OE having the third electrode bars E3. The transparent conductive layer may include indium tin oxide (ITO), indium zinc oxide (IZO), etc.

The first sub-electrode PE1 is electrically connected to the drain electrodes DE1 and DE2 of the first and second switching elements TR1 and TR2, respectively, through the first and second contact portions CNT1 and CNT2, respectively. The second sub-electrode PE2 is plotted to be spaced apart from the first sub-electrode PE1 and the coupling electrode 125.

Alternatively, an organic layer (not shown) may be further formed between the passivation layer 140 and the first and second sub-electrodes PE1 and PE2 to planarize the array substrate 100.

In one or more embodiments (e.g. Embodiment 1), the coupling electrode 125 and the gate line GL are simultaneously formed. Alternatively, the coupling capacitor 125 may be formed when the source electrodes SE1 and SE2 are formed.

Example Embodiment 2

Figure 4:
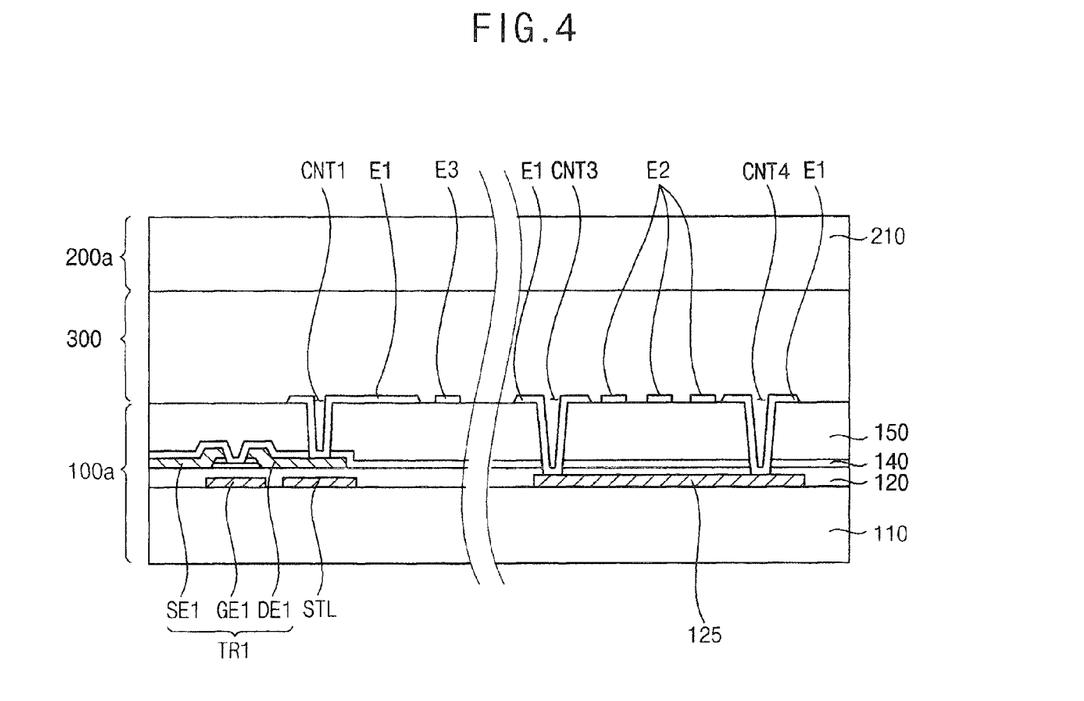
FIG. 4 is a cross-sectional view illustrating an LCD device in accordance with one or more embodiments (Embodiment 2)

FIG. 4 is a cross-sectional view illustrating an LCD device in accordance with one or more embodiments (e.g. Embodiment 2).

The LCD device described in FIG. 4 is similar to the LCD device according to Embodiment 1 described above with respect to FIGS. 2 and 3 except for a color filter layer 150. Identical reference numerals are used in FIG. 4 to refer to components that are the same or like those described in previous embodiments (e.g. with respect to FIGS. 2 and 3), and thus a detailed description thereof will be omitted.

Referring to FIG. 4, one or more embodiments of an LCD device (e.g. Embodiment 2) include an array substrate 100a having color filter layer 150 formed thereon and an opposite substrate 200a combining with the array substrate 100a to receive a liquid crystal layer 300.

The array substrate 100a may include a first base substrate 110, a gate insulation layer 120, a passivation layer 140, the color filter layer 150, a first sub-electrode PE1, a second sub-electrode PE2, and an opposite electrode OE. The gate insulation layer 120 is formed on the first base substrate 110 to cover a gate electrode GE1 of a first switching element TR1, a gate line GL, a storage line STL, and a coupling electrode 125. The passivation layer 140 is formed on the gate insulation layer 120.

The color filter layer 150 is formed on the passivation layer 140 to planarize the array substrate 100a. The color filter layer 150 may be formed by patterning through an etching process of a color photoresist layer, or may be formed by an ink printing process. The color filter layer 150 may include a red color filter, a green color filter, and a blue color filter.

The first sub-electrode PE, the second sub-electrode PE2 and the opposite electrode OE are formed on the color filter layer 150. The first sub-electrode PE, the second sub-electrode PE2, and the opposite electrode OE may include an optically transparent and electrically conductive material. The first sub-electrode PE may include a plurality of first electrode bars E1 having a bar-shape patterned thereon, and the second sub-electrode PE2 may include a plurality of second electrode bars E2 having a bar-shape patterned thereon. The opposite electrode OE may include a plurality of third electrode bars E3 having a bar-shape patterned thereon.

In one or more embodiments, the array substrate 100a may further include a light-blocking layer (not shown) interposed between the first switching element TR1 and the first base substrate 110.

The opposite substrate 200a may include a second base substrate 210. The light-blocking layer may be formed on the second base substrate 210 and not on the array substrate 100a.

Example Embodiment 3

Figure 5:
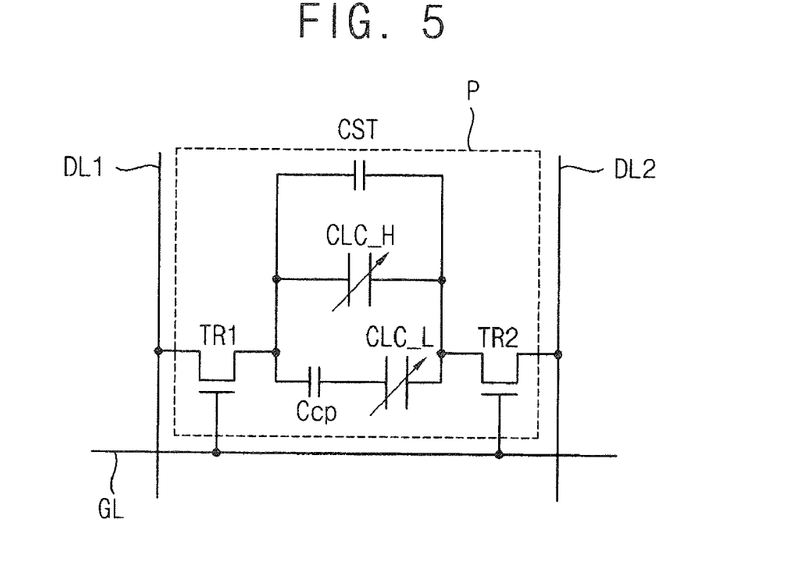
FIG. 5 is an equivalent circuit diagram illustrating an LCD device in accordance with one or more embodiments (Embodiment 3)

FIG. 5 is an equivalent circuit diagram illustrating an LCD device in accordance with one or more embodiments (e.g. Embodiment 3).

The LCD device described in FIG. 5 is similar to the LCD device according to Embodiment 1 described with respect to FIG. 1 except for a storage capacitor CST. Identical reference numerals are used in FIG. 5 to refer to components that are the same or like those described with respect to FIG. 1 (e.g. Embodiment 1), and thus a detailed description thereof will be omitted. In addition, one or more embodiments of a method of manufacturing the array substrate 100b according to Embodiment 3 are substantially the same as the method of manufacturing the array substrate 100 according to embodiments described with respect to FIGS. 2 and 3. Thus, a detailed description thereof will be omitted.

Referring to FIG. 5, the LCD device includes a pixel P. The pixel P is electrically connected to a gate line GL, a first data line DL1 crossing the gate line GL, and a second data line DL2 in parallel with the first data line DL1. The pixel P may include a first switching element TR1, a second switching element TR2, a first liquid crystal capacitor CLC_H, a second liquid capacitor CLC_L, a coupling capacitor Ccp and the storage capacitor CST.

The first data line DL1 transmits a first voltage to the first switching element TR1 of the pixel P, and the second data line DL2 transmits a second voltage to the second switching element TR2 of the pixel P. For one example, the second voltage may be identical to the first voltage. For another example, the second voltage may be different from the first voltage.

In one or more embodiments, the storage capacitor CST is connected to the first liquid capacitor CLC_H in parallel with. The storage capacitor CST may include a first electrode electrically connected to a first electrode of the first liquid capacitor CLC_G and a second electrode electrically connected to a second electrode of the first liquid capacitor CLC_H.

In accordance with one or more embodiments (e.g. Embodiment 3), the first liquid capacitor CLC_H is only connected to the storage capacitor CST, so that the structure of the LCD device according to example Embodiment 3 may be simplified in comparison with that of the LCD device according to example Embodiment 1.

Example Embodiment 4

Figure 6:
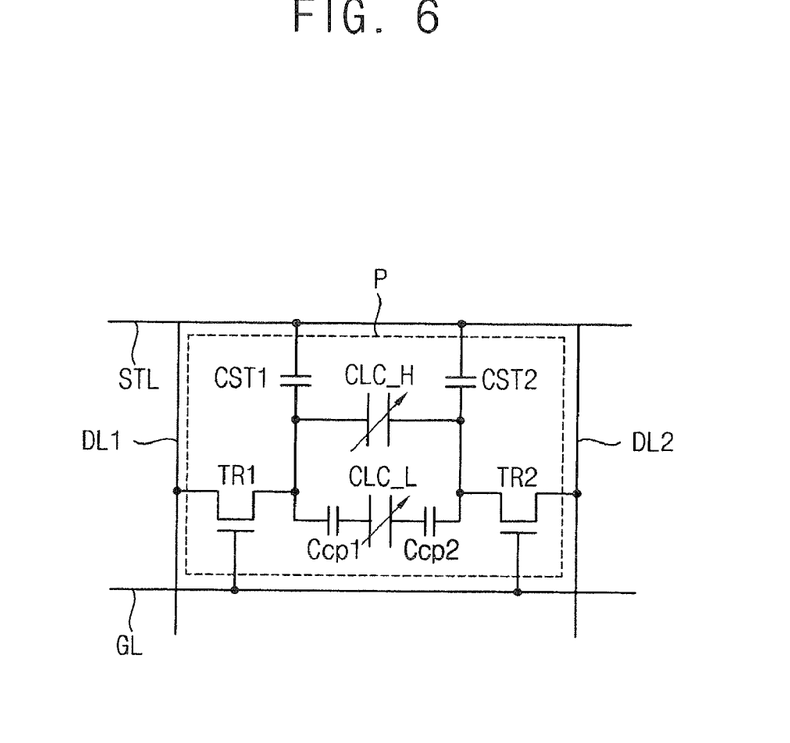
FIG. 6 is an equivalent circuit diagram illustrating an LCD device in accordance with one or more embodiments (Embodiment 4)

FIG. 6 is an equivalent circuit diagram illustrating an LCD device in accordance with one or more embodiments (e.g. Embodiment 4).

The LCD device described in FIG. 6 is similar to the LCD device according to embodiments described with respect to FIG. 1 except for a second coupling capacitor Ccp. Thus, identical reference numerals are used in FIG. 6 to refer to components that are the same or like those described in previous embodiments (e.g. Embodiment 1), and thus a detailed description thereof will be omitted.

Referring to FIG. 6, the LCD device includes a pixel P electrically connected to a gate line GL, a first data line DL1 crossing the gate line GL, and a second data line DL2 substantially in parallel with the first data line DL1. The pixel P may include a first switching element TR1, a second switching element TR2, a first liquid capacitor CLC_H, a second liquid capacitor CLC_L, a first coupling capacitor Ccp1, a second coupling capacitor Ccp2, a first storage capacitor CST1, and a second storage capacitor CST2.

The first coupling capacitor Ccp1 may include a first electrode electrically connected to a drain electrode of the first switching element TR1 and a second electrode electrically connected to a first electrode of the second liquid capacitor CLC_L.

The second coupling capacitor Ccp2 may include a first electrode electrically connected to a drain electrode of the second switching element TR2 and a second electrode electrically connected to a second electrode of the second liquid capacitor CLC_L.

When the first and second coupling capacitors Ccp1 and Ccp2 are formed at two end portions of the second liquid capacitor CLC_L, afterimages may be prevented from being generated due to a remaining direct current component.

Example Embodiment 5

Figure 7:
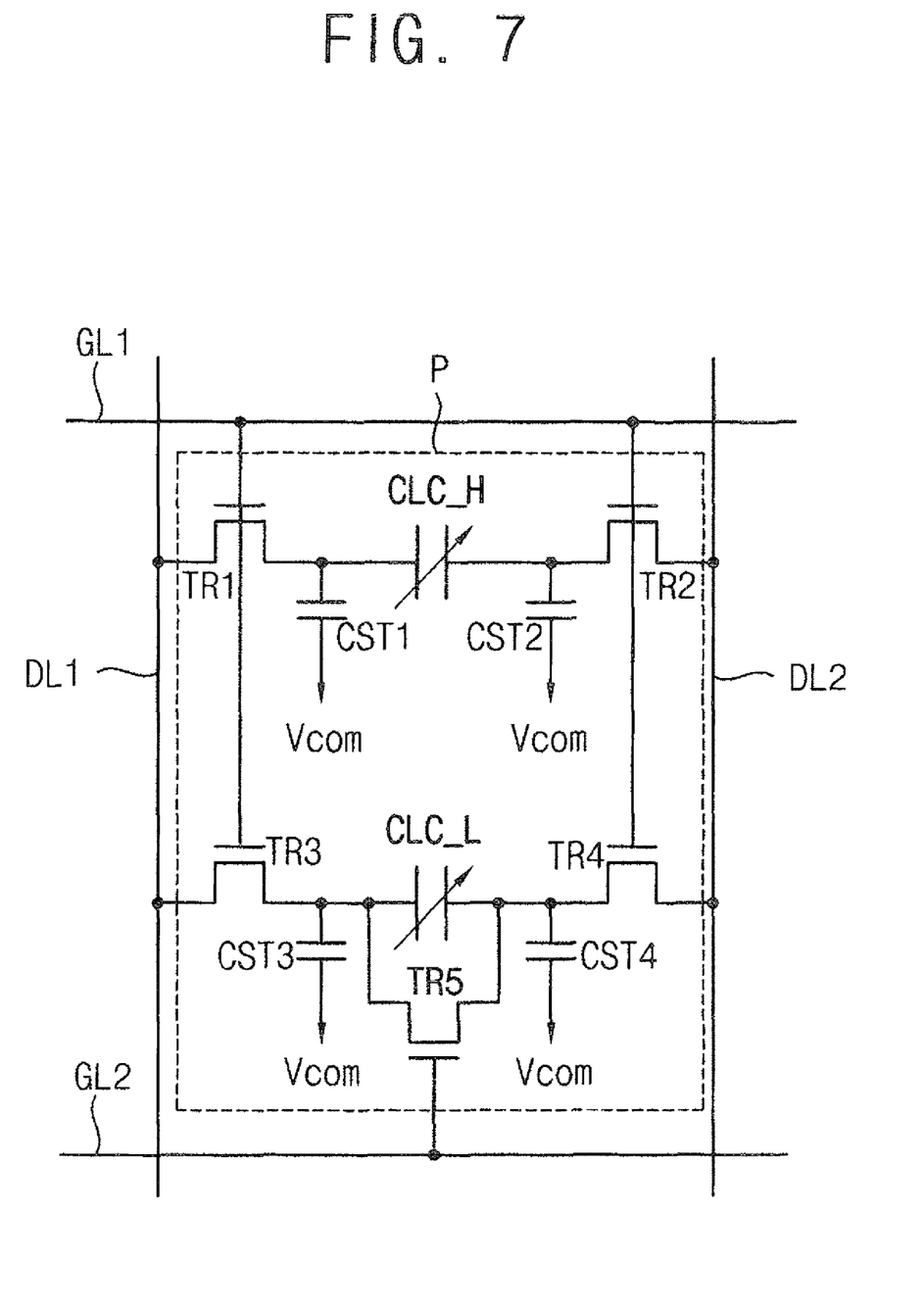
FIG. 7 is an equivalent circuit diagram illustrating an LCD device in accordance with one or more embodiments of the present invention (Embodiment 5)

FIG. 7 is an equivalent circuit diagram illustrating an LCD device in accordance with one or more embodiments (e.g. Embodiment 5).

Referring to FIG. 7, the LCD device includes a pixel P. The pixel P is driven by gate signals and data signals. The gate signals are transmitted to the pixel P through a first gate line GL1 and a second gate line GL2. The data signals are transmitted to the pixel P through a first data line DL1 and a second data line DL2.

The pixel P may include a first switching element TR1, a second switching element TR2, a first liquid crystal capacitor CLC_H, a first storage capacitor CST1, a second storage capacitor CST2, a third switching element TR3, a fourth switching element TR4, a second liquid crystal capacitor CLC_L, a third storage capacitor CST, a fourth storage capacitor CST, and a fifth switching element TR5. The first and second data lines DL1 and DL2 are extended along a direction crossing the gate line GL.

The first data line DL1 transmits a first voltage to the first and third switching elements TR1 and TR3, and the second data line DL2 transmits a second voltage to the second and fourth switching elements TR2 and TR4. The first and second voltages may have polarities different from each other with respect to a common voltage Vcom applied to a storage line (not shown). For example, the first voltage may have a positive polarity, and the second voltage may have a negative polarity. The second voltage is synchronized with the first voltage.

The first gate line GL1 transmits a first gate signal, and the second gate line GL2 transmits a second gate signal.

The first switching element TR1 may include a gate electrode electrically connected to the first gate line GL1, a source electrode electrically connected to the first data line DL1, and a drain electrode electrically connected to a first electrode of the first liquid capacitor CLC_H.

The second switching element TR2 may include a gate electrode electrically connected to the second gate line GL2, a source electrode electrically connected to the second data line DL2, and a drain electrode electrically connected to a second electrode of the second liquid capacitor CLC_L.

The first liquid crystal capacitor CLC_H may include a first electrode electrically connected to the drain electrode of the first switching element TR1, a second electrode electrically connected to the drain electrode of the second switching element TR2, and liquid crystal interposed between the first electrode and the second electrode.

The first storage capacitor CST1 may include a first electrode electrically connected to the drain electrode of the first switching element TR1, and a second electrode receiving the common voltage Vcom.

The second storage capacitor CST2 may include a first electrode electrically connected to the drain electrode of the second switching element TR2, and a second electrode receiving the common voltage Vcom. The first and second storage capacitors CST1 and CST2 maintaining a first pixel voltage charged in the first liquid capacitor CLC_H for one frame.

The third switching element TR3 may include a gate electrode electrically connected to the first gate line GL1, a source electrode electrically connected to the first data line DL1, and a drain electrode electrically connected to a first electrode of the second liquid capacitor CLC_L.

The fourth switching element TR4 may include a gate electrode electrically connected to the first gate line GL1, a source electrode electrically connected to the second data line DL2, and a drain electrode electrically connected to a second electrode of the second liquid capacitor CLC_L.

The second liquid crystal capacitor CLC_L may include a first electrode electrically connected to the drain electrode of the third switching element TR3, a second electrode electrically connected to the drain electrode of the fourth switching element TR4 and liquid crystal interposed between the first electrode and the second electrode.

The third storage capacitor CST3 may include a first electrode electrically connected to the drain electrode of the third switching element TR3, and a second electrode receiving the common voltage Vcom.

The fourth storage capacitor CST4 may include a first electrode electrically connected to the drain electrode of the fourth switching element TR4, and a second electrode receiving the common voltage Vcom. The third and fourth storage capacitors CST3 and CST4 maintaining a second pixel voltage charged in the second liquid capacitor CLC_L for one frame.

The fifth switching element TR5 may include a gate electrode electrically connected to the second gate line GL2, a source electrode electrically connected to the first electrode of the second liquid capacitor CLC_L, and a drain electrode electrically connected to a second electrode of the second liquid capacitor CLC_L.

A driving method of the pixel P will be described.

In one or more embodiments, when the first gate signal is applied to the first gate line GL1, the first to fourth switching element TR1, TR2, TR3 and TR4 are turned on. Thus, first and second pixel voltages are respectively charged in the first and second liquid crystal capacitors CLC_H and CLC_L by the first voltage being transmitted through the first data line DL1 and the second voltage being transmitted through the second data line DL2. The first and second pixel voltages have substantially the same level because the first and second liquid crystal capacitors CLC_H and CLC_L have substantially the same response to the first gate signal to be charged in the first and second liquid crystal capacitor CLC_H and CLC_L. When the second gate signal is applied to the second gate line GL2, the fifth switching elements TR5 are turned on, and the second pixel voltage charged in the second liquid capacitor CLC_L is reduced by a predetermined level. The fifth switching element TR5 is designed so that the second pixel voltage is about 0.5 to about 0.8 times the first pixel voltage. A width W and a length L of the fifth switching element TR5 may be designed according to the conditions.

Figure 8:
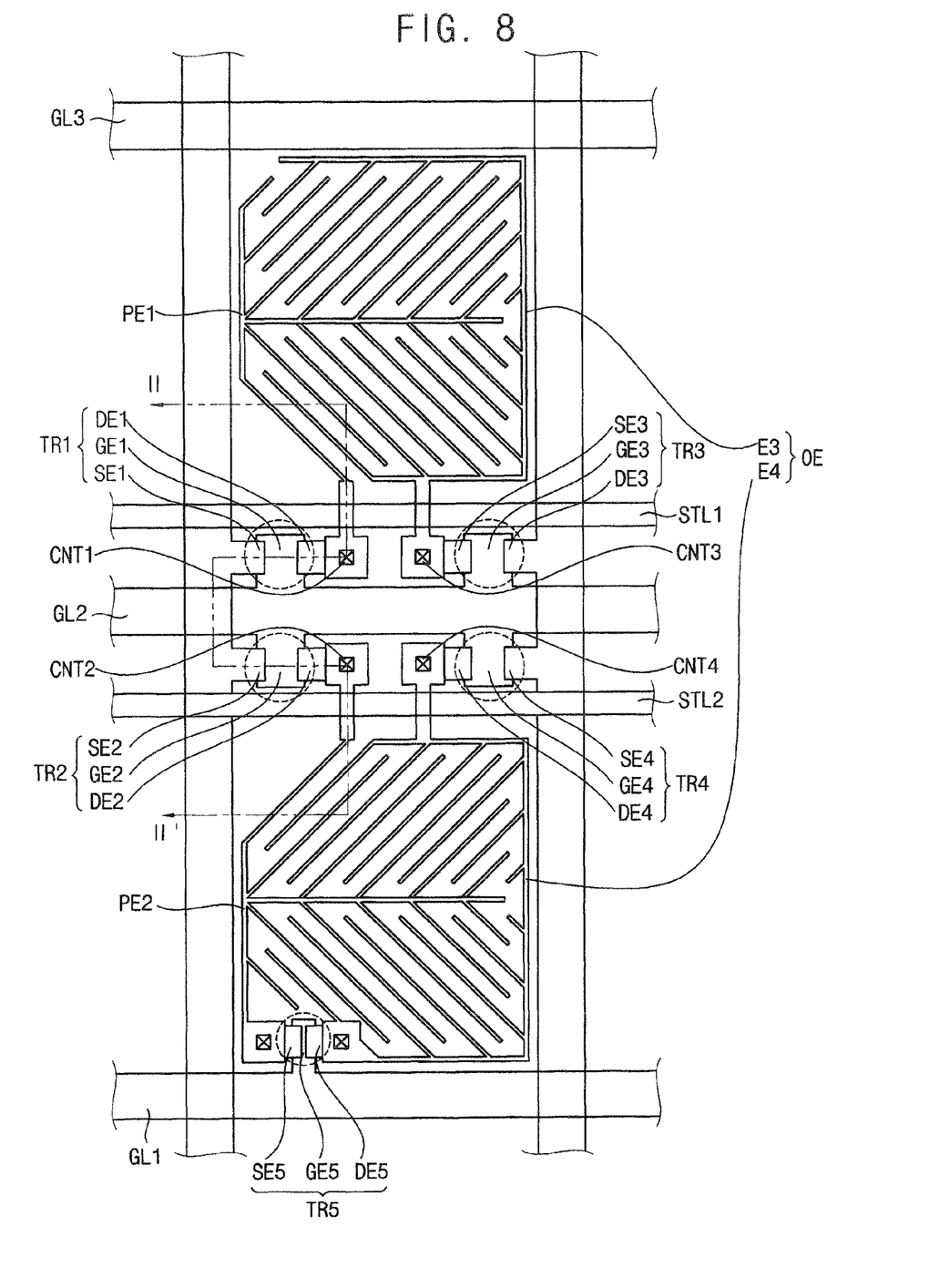
FIG. 8 is a plan view illustrating the LCD device of FIG. 7 in accordance with one or more embodiments.
Figure 9:
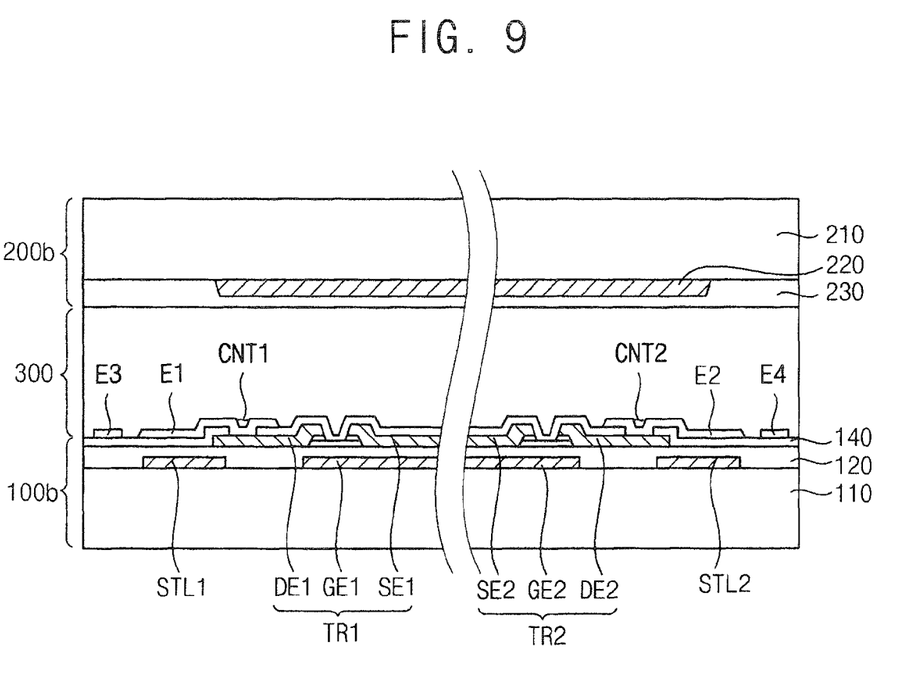
FIG. 9 is a cross-sectional view taken along a line II-II' in FIG. 8 in accordance with one or more embodiments.

FIG. 8 is a plan view illustrating the LCD device of FIG. 7. FIG. 9 is a cross-sectional view taken along a line II-II' in FIG. 8.

Referring to FIGS. 7 to 9, one or more embodiments of an LCD device may include an array substrate 100b and an opposite substrate 200b combing with the array substrate 100b to receive a liquid crystal layer 300.

The array substrate 100b may include a first base substrate 110 having pixel area defined thereon. The first base substrate 110 may have gate electrodes GE1 to GE5 of the first to fifth switching elements TR1, TR1, TR1, TR4, and TR5, first to third gate lines GL1 to GL3, the first and second storage lines STL1 and STL2, a pixel electrode PE, and an opposite electrode OE facing the pixel electrode PE formed thereon. The pixel electrode PE may include a first sub-electrode PE1 and a second sub-electrode PE2.

The first switching element TR1 is formed in an adjacent area crossing the second gate line GL2 and the first data line DL1. A gate electrode GE1 of the first switching element TR1 is electrically connected to the second gate line GL, a source electrode SE1 of the first switching element TR1 is electrically connected to the first data line DL1, and a drain electrode DE1 of the first switching element TR1 is electrically connected to the first sub-electrode PE1 through a first contact portion CNT1.

The second switching element TR2 is formed in an adjacent area crossing the second gate line GL2 and the first data line DL1. A gate electrode GE2 of the second switching element TR2 is electrically connected to the second gate line GL, a source electrode SE2 of the first switching element TR1 is electrically connected to the second data line DL2, and a drain electrode DE2 of the first switching element TR1 is electrically connected to the second sub-electrode PE2 through a second contact portion CNT2.

A gate electrode GE3 of the third switching element TR3 is electrically connected to the second gate line GL2, a source electrode SE3 of the third switching element TR3 is electrically connected to the second data line DL1, and a drain electrode DE3 of the third switching element TR3 is electrically connected to a portion of third electrode bars E3 of the opposite electrode OE.

A gate electrode GE4 of the fourth switching element TR4 is electrically connected to the second gate line GL2, a source electrode SE4 of the fourth switching element TR4 is electrically connected to the second data line DL1, and a drain electrode DE4 of the fourth switching element TR4 is electrically connected to a portion of fourth electrode bars E4 of the opposite electrode OE.

The first sub-electrode PE1 and the second sub-electrode PE2 are spaced apart from each other with respect to an area having the first to fourth switching elements TR1, TR2, TR3 and TR4 formed thereon.

The first sub-electrode PE1 may include a plurality of patterned first electrode bars E1. The first electrode bars E1 are connected to the first switching element TR1 to receive the first voltage transmitted to the first data line DL1.

The second sub-electrode PE2 may include a plurality of patterned second electrode bars E2. The second electrode bars E2 are connected to the first switching element TR1 to receive the first voltage transmitted to the second data line DL2. In addition, the second electrode bars E2 are electrically connected to a source electrode SE5 of the fifth switching element TR5 through a fifth contact portion CNT5.

The opposite electrode OE may include a plurality of patterned third electrode bars E3 and a plurality of patterned fourth electrode bars E4. The third electrode bars E3 are connected to the third switching element TR3 to receive the second voltage transmitted to the second data line DL2. The fourth electrode bars E4 are connected to the fourth switching element TR4 to receive the second voltage transmitted to the second data line DL2. In addition, the fourth electrode bars E4 are electrically connected to a drain electrode DE5 of the fifth switching element TR5 through a sixth contact portion CNT6.

The third electrode bars E3 are formed between the first electrode bars E1. A first horizontal electric field is formed by the first and second voltages applied to the first and the third electrode bars E1 and E3. The fourth electrode bars E4 are formed between the second electrode bars E2. A second horizontal electric field is formed by the first and second voltages applied to the second and fourth electrode bars E2 and E4.

The first to fourth electrode bars E1, E2, E3, and E4 may have a comb shape. The first and second electrode bars E1 and E2 may protrude toward the second data line DL2, and the third electrode bars E3 may protrude toward the first data line DL1. An interval of the first and second electrode bars E1 and E2 is substantially the same as an interval of the third and the fourth electrode bars E3 and E4.

A gate electrode GE5 of the fifth switching element TR5 is electrically connected to the first gate line GL1, a source electrode SE5 of the fifth switching element TR5 is electrically connected to a portion of the second electrode bars E2, and a drain electrode DE5 of the fifth switching element TR5 is electrically connected to a portion of fourth electrode bars E4.

The first to fourth switching elements TR1, TR2, TR3, and TR4 are turned on in response to the first gate signal receiving to the second and third gate line GL2 and GL3, and the fifth switching element TR5 is turned on in response to the second gate signal being applied to the second gate line GL2. The second and third gate lines GL2 and GL3 are electrically connected to each other to receive the first gate signal.

The first storage line STL1 is electrically connected to first and the third electrode bars E1 and E3 through the drain electrode bars DE1 and DE2 of the first and the third switching elements TR1 and TR3, and the first and second contact portions CNT1 and CNT2. The first storage line STL1 overlaps a portion of the first and the third electrode bars E1 and E3. The first storage capacitor CST1 is defined by the gate insulation layer 120 formed between the first electrode bar E1 and the first storage line STL1, and the passivation layer 140. The second storage capacitor CST2 is defined by the gate insulation layer 120 formed between the third electrode bar E2 and the first storage line STL1, and the passivation layer 140.

The second storage line STL2 is electrically connected to the second and fourth electrode bars E2 and E4 through the drain electrodes DE3 and DE4 of the second and fourth switching elements TR2 and TR4, and the third and the fourth contact portions CNT3 and CNT4. The second storage line STL2 is overlapped with a portion of the second and fourth bars E2 and E4. The third storage capacitor CST3 is defined by the gate insulation layer 120 formed between the second electrode bar E2 and the second storage line STL2 and the passivation layer 140, and the fourth storage capacitor CST4 is defined by the gate insulation layer 120 formed between the fourth electrode bar E4 and the second storage line STL2. The first and second storage lines STL1 and STL2 receive the common voltage Vcom.

The opposite substrate 200b may include a second base substrate 210. A light-blocking layer 220 and a color filter layer 230 are formed on the second base substrate 210.

The light-blocking layer 220 is formed in an area which surrounds edges of the first and second sub-electrodes PE1 and PE2. The light-blocking layer 220 may include a material having conductivity to block light.

The color filter layer 230 is formed on the second base substrate 210 corresponding to the first and second sub-electrodes PE1 and PE2 of the array substrate 100b. The color filter layer 230 may include a red color filter, a green color filter, and a blue color filter.

The liquid crystal layer 300 is vertically aligned to block light in a non-electric field state. The liquid crystal is inclined by a horizontal electric field formed between the first and second electrode bars E1 and E2, and a horizontal electric field formed between the third and the fourth electrode bars E3 to transmit light in an electric field state.

Hereinafter, a process for forming the array substrate 100 in accordance with one or more embodiments (e.g. Embodiment 5) will be described with reference to FIGS. 8 and 9.

Referring to FIGS. 8 and 9, a gate metal layer (not shown) is formed on the first base substrate 110, and the gate metal layer is patterned to form a gate metal pattern having the gate line GL1, the gate electrodes GE1 and GE2 of the first to fifth switching elements TR1, TR2, TR3, TR4, and TR5, and the first and second storage lines STL1 and ST2.

The gate insulation layer 120 is formed on the first base substrate 110 having the gate metal pattern formed thereon. The semiconductor patterns are formed on the first base substrate 110 having the gate insulation layer 120 formed thereon.

A source metal layer is formed on the first base substrate 110 having the semiconductor patterns formed thereon. The source metal layer is patterned by etching process to form the first and second data lines DL1 and DL2, the source electrodes SE1 and SE2, and the drain electrodes DE1 and DE2.

The passivation layer 140 is formed on the first base substrate 110 having the source metal pattern formed thereon.

The passivation layer 140 may be formed of materials, for example, silicon nitride (SiNx), silicon oxide (SiOx), etc.

The passivation layer 140 is etched to form the first to sixth contact portions CNT1, CNT2, CNT3, CNT4, CNT5, and CNT6 exposing the drain electrodes DE1 to DE4 of the first to fourth switching elements TR1, TR2, TR3, and TR4, a source electrode SE5, and a drain electrode DE5 of the fifth switching element TR5.

A transparent conductive layer is formed on the first base substrate 100 having the first to sixth contact portions CNT1, CNT2, CNT3, CNT4, CNT5, and CNT6 formed thereon. The transparent conductive layer is patterned to form the first sub-electrode PE1 having the first electrode bars E1, a second sub-electrode PE2 having the second electrode bars E2 and an opposite electrode OE having the third and the fourth electrode bars E3 and E4. The transparent conductive layer is formed of materials, for example, indium tin oxide (ITO), indium zinc oxide (IZO), etc.

The first sub-electrode PE1 is electrically connected to the drain electrode DE1 of the first switching element TR1 through the first contact portion CNT1. The second sub-electrode PE2 is electrically connected to the drain electrode DE2 of the second switching element TR2 through the second contact portion CNT2. The second sub-electrode PE2 is electrically connected to a source electrode SE5 of the fifth switching element TR5 through the fifth contact portion CNT5. The opposite electrode OE is electrically connected to a source electrode SE2 of the third switching element TR3 through the third contact portion CNT3. The opposite electrode OE is electrically connected to a source electrode SE4 of the fourth switching element TR4 through the fourth contact portion CNT4.

In accordance with one or more embodiments described with respect to FIG. 7 (e.g. Embodiment 5), the switching elements apply to the first and second sub-electrodes PE1 and PE2 the voltage different from each other. Thus, side visibility may be improved.

In accordance with one or more embodiments of an array substrate and an LCD device having the same may apply a horizontal electric field process. A pixel is divided into two sub-pixels, and pixel voltages different from each other are applied to the two sub-pixels by using a coupling capacitor or a switching element to improve side visibility. In addition, the two pixels may be driven by a dual polarity process, and intervals of electrode bars having the two sub-pixels may be uniform. Accordingly, response time and image quality may be improved.

The foregoing is illustrative of embodiments of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of embodiments of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. An array substrate comprising:
    a pixel electrode comprising a first sub-electrode having a plurality of first electrode bars receiving a first voltage and a second sub-electrode having a plurality of second electrode bars, wherein the first and second pluralities of electrode bars are spaced apart from each other;
    a coupling electrode electrically connected to a portion of the plurality of first electrode bars and overlapping a portion of the plurality of second electrode bars to form a coupling capacitor; and
    an opposite electrode disposed between the plurality of first electrode bars and the plurality of second electrode bars to receive a second voltage and having a plurality of opposite electrode bars.

2. The array substrate of claim 1, further comprising:
    a first switching element connected to a first data line and the plurality of first electrode bars to apply the first voltage to the plurality of first electrode bars; and
    a second switching element connected to a second data line adjacent to the first data line and the plurality of opposite electrode bars to apply the second voltage to the plurality of opposite electrode bars.

3. The array substrate of claim 2, wherein the first and second voltages have a phase opposite to that of a reference voltage.

4. The array substrate of claim 2, further comprising:
    a gate line electrically connected to the first and second switching elements; and
    a storage line formed in parallel with the gate line and overlapping a portion of the first sub-electrode and the opposite electrode to define a first storage capacitor and a second storage capacitor.

5. The array substrate of claim 1, wherein the coupling electrode and the gate line are formed from the same material.

6. The array substrate of claim 1, wherein the coupling electrode and the source electrode of the first and second switching elements are formed from the same material.

7. The array substrate of claim 1, further comprising a color filter layer formed between a base substrate and the pixel electrode, the base substrate having the gate line, and the first and second data lines formed thereon.

8. A liquid crystal display (LCD) device comprising:
    a first switching element connected to a gate line and a first data line crossing the gate line to receive a first voltage;
    a second switching element connected to the gate line and a second data line to receive a second voltage;
    a first liquid crystal capacitor connected between an output terminal of the first switching element and an output terminal of the second switching element;
    a second liquid crystal capacitor connected in parallel to the first liquid crystal capacitor between the output terminal of the first switching element and the output terminal of the second switching element; and
    a coupling capacitor connected in series to the second liquid crystal capacitor between the output terminal of the first switching element and a first electrode of the second liquid crystal capacitor.

9. The LCD device of claim 8, further comprising:
    a first storage capacitor having a first electrode connected to a first electrode of the first liquid capacitor and a second electrode receiving a common voltage; and a second storage capacitor having a first electrode connected to a second electrode of the first liquid crystal capacitor and a second electrode receiving the common voltage.

10. The LCD device of claim 8, wherein the first and the second voltages have a polarity different from each other with respect to a common voltage.

11. The array substrate of claim 1, wherein the second sub-electrode has a center portion formed at the center of a pixel region and extended parallel to a gate line.

12. The array substrate of claim 11, wherein the coupling electrode has a center portion formed at a center of a pixel region and extended parallel to a gate line.

13. The array substrate of claim 12, wherein the first and the second voltages have a polarity different from each other with respect to a common voltage.

14. The array substrate of claim 12, wherein an interval between the first and second sub-electrodes and the opposite electrode is substantially same.

15. The array substrate of claim 12, wherein the coupling electrode is formed of gate material and the pixel electrode and the opposite electrode are formed of same material.

16. The array substrate of claim 11, wherein the first and the second voltages have a polarity different from each other with respect to a common voltage.

17. The array substrate of claim 16, wherein an interval between the first and second sub-electrodes and the opposite electrode is substantially same.

18. The array substrate of claim 16, wherein the coupling electrode is formed of gate material and the pixel electrode and the opposite electrode are formed of same material.

19. The array substrate of claim 11, wherein an interval between the first and second sub-electrodes and the opposite electrode is substantially same.

20. The array substrate of claim 19, wherein the coupling electrode is formed of gate material and the pixel electrode and the opposite electrode are formed of same material.

* * * * *